United States Patent [19]
Keyser et al.

[11] Patent Number: 5,316,682
[45] Date of Patent: May 31, 1994

[54] GAS MICRONIZER AND PURIFICATION SYSTEM AND RELATED METHODS

[75] Inventors: Gene E. Keyser; Ellis O. Barnes, both of Jacksonville, Fla.

[73] Assignee: Key Solutions, Inc., Jacksonville, Fla.

[21] Appl. No.: 37,993

[22] Filed: Mar. 25, 1993

[51] Int. Cl.$^5$ .............................................. B01D 61/00
[52] U.S. Cl. ..................................... 210/649; 210/704; 210/805; 210/242.2; 210/195.2; 210/195.3
[58] Field of Search ............... 210/649, 650, 652, 704, 210/625, 607, 195.2, 242.2, 623, 202, 195.3, 604, 626, 608, 609, 629, 195.2, 805; 261/94, 100, 122, 124, DIG. 70

[56] References Cited

U.S. PATENT DOCUMENTS

| | | | |
|---|---|---|---|
| 3,773,659 | 11/1973 | Carlson et al. | 210/151 |
| 4,069,147 | 1/1978 | Abrams et al. | 210/604 |
| 4,132,637 | 1/1979 | Key et al. | 210/195.3 |
| 4,287,070 | 9/1981 | Pollock | 210/626 |
| 4,624,791 | 11/1986 | Ferriss | 210/704 |
| 4,861,471 | 8/1989 | Kakao et al. | 210/195.3 |
| 4,968,429 | 11/1990 | Yen | 210/652 |
| 5,254,253 | 10/1993 | Behmann | 210/195.2 |

Primary Examiner—Robert A. Dawson
Assistant Examiner—Ana M. Fortuna
Attorney, Agent, or Firm—Cesari and McKenna

[57] ABSTRACT

Apparatus and methods for the controlled introduction of submicron-sized bubbles into a fluid stream. The gas-micronizer apparatus of the present invention operates in a manner that maximizes the turbulence of the liquid flow stream at the interface of the porous surface while flowing essentially parallel to the porous surface through which gas enters to form bubbles, thereby ensuring that the gas streams through the pores are dispersed quickly into the bulk liquid flow and/or are of sufficiently small size as to behave as rigid spheres that do not easily coalesce. In a preferred embodiment, the membrane is of generally tubular shape with a nominal surface porosity of 25-30%, and an average pore size below 1 micron (and ideally about 0.2 micron). Fluid is provided to the inlet of the membrane element (by means of a pump) through an inwardly tapered approach conduit. An outwardly tapered exit conduit extends from the outlet end of the element, thereby forming a venturi arrangement. Surrounding the membrane is a sealed chamber into which the gas is supplied under pressure.

35 Claims, 8 Drawing Sheets

GAS MICRONIZER AND PURIFICATION SYSTEM AND RELATED METHODS

BACKGROUND OF THE INVENTION

A. Field of the Invention

The present invention relates to purification of contaminated liquids and effluent, and more particularly to apparatus and methods for the production and utilization of submicron gas bubbles to facilitate wastewater treatment, biopurification processes and desalination pretreatment.

B. Description of the Related Art

Population growth and the worldwide expansion of heavy industry have dramatically increased the amount of wastewater and other deleterious fluid effluent introduced into the environment. The need to cope with ever-growing volumes of contaminated liquids has engendered significant and varied research into ways of separating hazardous or polluting materials from a bulk liquid source. A growing number of fluid-treatment methodologies rely on controlled introduction of gas into the contaminated fluid.

In one approach, frequently termed "bioremediation," microorganisms digest waste products dissolved or entrained in a contaminated liquid and, in so doing, convert them into inert or less harmful substances. These microorganisms typically require large available quantities of oxygen to function effectively. In a typical bioremediation system, waste-degrading microorganisms are contained in a bioreactor equipped with a recycle loop, where the circulating liquid is aerated to nourish the microorganisms. For example, U.S. Pat. No. 5,151,187 teaches use of a membrane filtration system in tandem with an in-line membrane micronizer along the recycle loop. The micronizer includes a tubular porous membrane surrounded by a hollow chamber. Fluid passes axially through the bore of the membrane while air, introduced into the housing under pressure, penetrates the pores radially to form small bubbles along the inner wall of the membrane; these bubbles enter the flowing liquid, and feed the microorganisms.

"Flotation" systems utilize gas bubbles mechanically to draw particulate matter to the surface of the bulk liquid, where it is readily skimmed off and disposed of. Naturally, the effectiveness of such systems depends both on the capacity of the bubbles to transport particles within the liquid and a sufficient number of bubbles to ensure rapid interaction with and capture of particles.

Other gasification systems, such as chlorination or ozonation of drinking water, rely on the bactericidal or other direct effects of the gas on suspended or dissolved contaminants.

In all of these systems it is the interfacial contact area, rather than the absolute volume of introduced gas that determines its utilization—by microorganisms, or in terms of ability to sequester or otherwise interact with contaminant—and researchers have therefore recognized the benefits of introducing gas in the form of finely sized bubbles to obtain the maximum possible gas surface area. In one well-known approach, gas is dissolved in a liquid at pressures above atmospheric in accordance with Henry's Law, and environmental conditions (typically temperature and/or pressure) subsequently altered to reduce gas solubility. The change in conditions forces dissolved gas out of solution, at nucleation sites, in the form of small bubbles. Proper control of the amount of dissolved gas, the number of available nucleation sites, and the final conditions determines mean bubble size, with typical diameters in the range of 50–100 microns.

A primary disadvantage of this approach stems from practical operating constraints that limit the amount of dissolved gas (and therefore the overall generation rate and size of bubbles) in a liquid. For example, gas solubility is negatively affected by increasing temperature, necessitating relatively low operating temperatures during the initial dissolution phase. This may not be practical in large operating environments. Moreover, after dissolution, significant input of energy and time may be required to obtain the higher temperatures needed to selectively reduce gas solubility and form the small bubbles.

A second approach is to mechanically shear larger bubbles to reduce their mean diameter. Typical methods include feeding air to the suction of a centrifugal pump, entrapment by an aspirator, and entrainment by surface injection through the gas/liquid interface. These systems frequently require large quantities of energy for proper operation, and may be prone to various design complications (such as impeller cavitation). Furthermore, mechanical reduction of bubble size typically yields bubbles of mean diameter 200–5000 microns. Physical laws controlling impingement largely foreclose the possibility of creating bubbles smaller than 100 microns, and energy considerations render bubble sizes smaller than 200–300 microns impractical.

A third approach, as described in the '187 patent and U.S. Pat. No. 5,122,312, involves use of porous media (of tubular or plate configuration) to inject gases from a flat or convex surface. Such devices are subject to "fouling" or clogging of the pores by the wastewater (or particulate matter entrained therein) as it passes over the pores.

In addition to specific design disadvantages associated with the various methods of obtaining small bubbles, certain physical limitations tend to restrict the mean useful bubble diameter regardless of how the bubbles are generated. First, bubbles tend to coalesce into larger gas pockets if brought or allowed to remain too close to one another. For example, porous-media systems tend to exhibit significant coalescence at high bubble-generation rates, as bubbles crowd one another exiting the surface into the surrounding liquid. High surface porosity, generally used to reduce the energy requirements and material cost of the porous elements, aggravates this condition. Coalescence is further increased by the quiescent boundary layer (which is thick relative to bubble diameter) at the surface of the porous element, which retains the bubbles in close proximity to one another as they are formed. Conventional attempts to reduce the thickness of the boundary layer by increasing flow velocity ultimately fail to reduce coalescence, since they increase contact among bubbles.

A second limitation occurs as a result of pressure drop. Because of the inverse relationship between gas volume and pressure at constant temperature, bubble diameter increases with diminishing pressure. Thus, in the case of porous-media systems, high rates of bubble generation typically require long stretches of porous media, with pressure dropping lengthwise from inlet to outlet. The result is a net increase in bubble size at the outlet relative to the size at formation, as well as a wide range of bubble sizes due to the varying pressure drops experienced by bubbles formed at different points along the medium's length.

DESCRIPTION OF THE INVENTION

A. Objects of the Invention

Accordingly, it is an object of the present invention to generate and introduce into liquid media stable, finely sized gas bubbles without significant coalescence.

It is another object of the invention to generate and introduce into liquid media bubbles having a relatively confined distribution of diameters.

It is still another object of the invention to provide bubble-generation apparatus not subject to pore fouling.

Yet another object of the invention is to exploit certain surprising effects, as hereinafter described, that are obtained through the introduction of submicron-sized bubbles into contaminated media.

Other objects will, in part, be obvious and will, in part, appear hereinafter. The invention accordingly comprises the compositions, features of construction, combination of elements, arrangement of parts, and relations of process steps that will be exemplified in the following description, and the scope of the invention will be indicated in the clams.

B. Summary of the Invention

As discussed above, reduction in bubble diameter results in more efficient gasification of a liquid and better performance of processes that depend on interfacial contact with entrained gas. We have discovered, however, that the ability to generate bubbles with diameters below 1 micron provides operational benefits extending far beyond the expected increases in transfer efficiency. Furthermore, we have been able to overcome the physical limitations that have heretofore prevented reliable generation of small bubbles and their introduction into a waste stream.

Accordingly, the present invention exploits the unique properties associated with liquids into which high concentrations of very small, preferably submicron gaseous bubbles have been introduced to achieve surprisingly effective wastewater treatment. In addition, the apparatus of the present invention operates in a manner that avoids impingement between the flow stream and the inner surface of a porous membrane, through which gas enters to form bubbles, by maintaining a high degree of turbulence within the fluid and along the inner membrane surface. This effect reduces or prevents fouling and enables highly efficient gas utilization, since the wastewater never impinges on the membrane.

The benefits of this invention are obtained by flowing a fluid through a porous membrane under stringently controlled conditions. In particular, we employ extremely small membrane pores, high fluid velocities and controlled gas pressures to form submicron bubbles at a rate that prevents their coalescence, and to transport these bubbles under conditions that retard their coalescence.

We have found that, at small sizes, bubbles behave as relatively rigid spheres, resisting coalescence even in the presence of shearing or mixing forces. The gas micronizer of the present invention is configured both to create submicron bubbles and also to minimize pressure drop (with concomitant increase in bubble size) along the length of the porous membrane. In a preferred embodiment, the membrane is of generally tubular shape with a nominal maximum surface porosity of 25-30%, and a pore size below 1 micron (and ideally less than 0.2 micron).

Fluid is provided to the inlet of the membrane element (by means of a pump) through an inwardly tapered approach conduit. An outwardly tapered exit conduit extends from the outlet end of the element, thereby forming a venturi arrangement and avoiding entrance and exit effects of pressure drop. Surrounding the membrane is a sealed chamber into which the gas is supplied under pressure. (Due to the venturi effect, the gas-supply pressure need not be great; indeed, proper operation does not require the gas to be pressurized at all, although efficiency considerations make delivery under at least some pressure—1–5 psig, for example—advisable.)

The present invention is particularly well-suited to use in conjunction with bioremediation or biopurification systems, and provides results far superior to those associated with traditional systems. For example, the '187 patent noted above discloses a membrane-pore size of 1–100 microns and a flow rate of 1.5–10 meters per second (m/sec) to generate a shearing force that strips bubbles from the inner wall of the membrane. Fluid inside the bioreactor is maintained in a relatively turbulent state to achieve efficient utilization of the air introduced into the fluid by the micronizer. The '187 system also includes a membrane microfiltration subsystem to remove solids during recirculation.

Using a recycle configuration similar to that shown in the '187 patent, the present invention eliminates the need both for turbulence within the bioreactor and for a separate microfiltration unit. The extremely small bubbles formed in accordance with the principles described herein result not only in efficient gasification of the liquid due to higher surface area, but, surprisingly, also cause segregation of biological solids into a separate stable layer on the surface of the liquid contained in the bioreactor. This unexpected but highly advantageous layer, which can be readily skimmed off if desired, in turn provides a dynamic cover for the system and resists release of entrained gas into the surrounding atmosphere, further enhancing gas utilization and efficiency and substantially reducing volatile organic compound (VOC) emissions. It also increases solids content within a confined area, thereby promoting efficient utilization of biological digestion processes.

Formation of this layer is actually promoted by maintenance of a quiescent bioreactor environment. Indeed, the turbulent conditions envisioned in the '187 patent would not only prevent a solids layer from forming, but would also force the gas bubbles to coalesce into less efficient, larger gas pockets with high VOC emissions.

In short, introduction of submicron bubbles within a wastewater stream results in highly effective (and entirely unforeseen) flotation of solids for convenient disposal or efficient biodegradation, creation of a covering layer that provides gas-utilization efficiency, prevention of entrained and extraneous emissions, and the ability to eliminate the expense and apparatus (and its associated expense) necessary to maintain turbulence. The surprising results obtainable with the present invention will be further explicated in the examples that follow.

BRIEF DESCRIPTION OF THE DRAWINGS

The foregoing discussion will be understood more readily from the following detailed description of the invention, when taken in conjunction with the accompanying drawings in which.

DETAILED DESCRIPTION OF THE PREFERRED EMBODIMENTS

Figure 1:
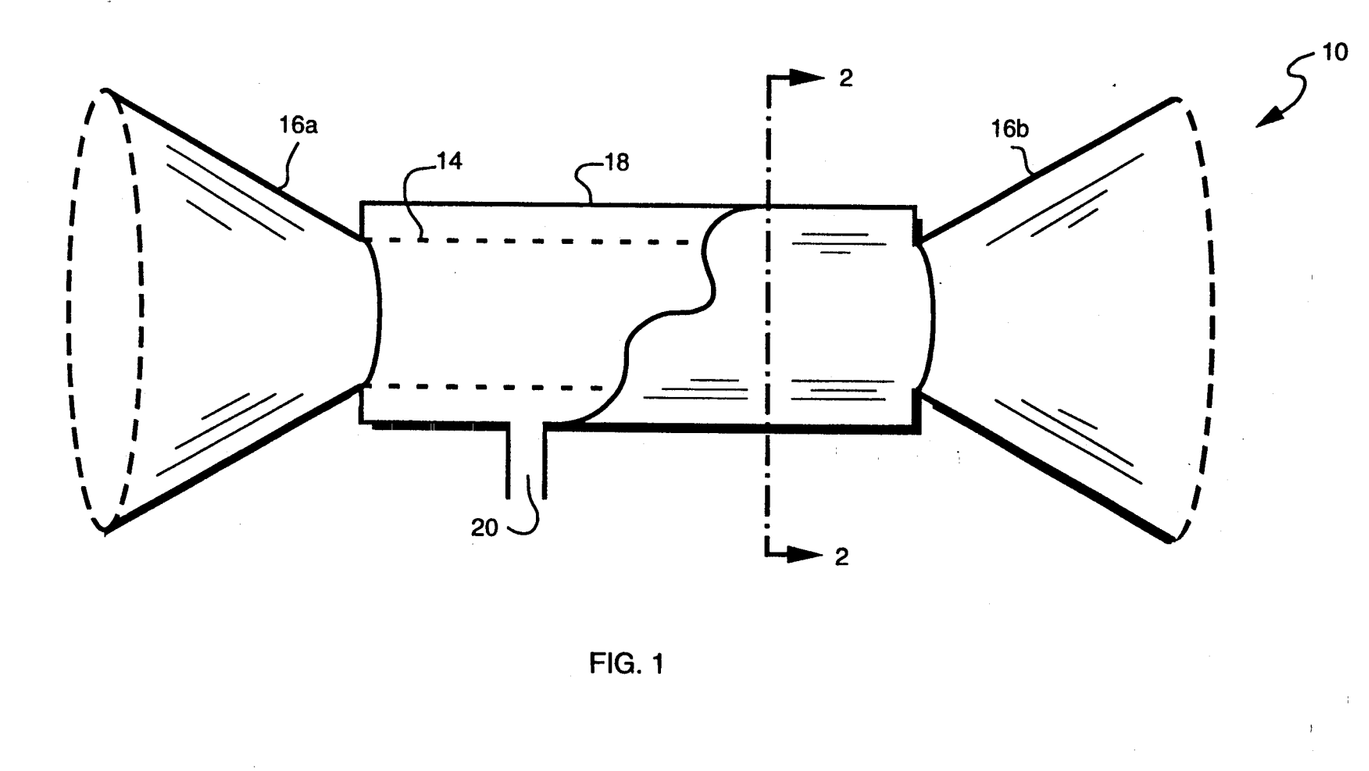
FIG. 1 is a partial cutaway side view of a device embodying the present invention.

Refer first to FIG. 1, which illustrates a gas micronizer incorporating the principles of the present invention. Denoted generally by reference numeral 10, the micronizer comprises a porous membrane element 14 coupled at each end to a tapered conduit 16a, 16b. Surrounding element 14 is a coaxial housing 18, sealed with respect to element 14 and capable of containing gas under elevated pressure. Gas is provided to housing 18 through a sealed, one-way inlet 20. Accordingly, fluid introduced into either tapered conduit passes axially through the bore of element 14, where it acquires bubbles of gas radially penetrating the pores of element 14.

Figure 2:
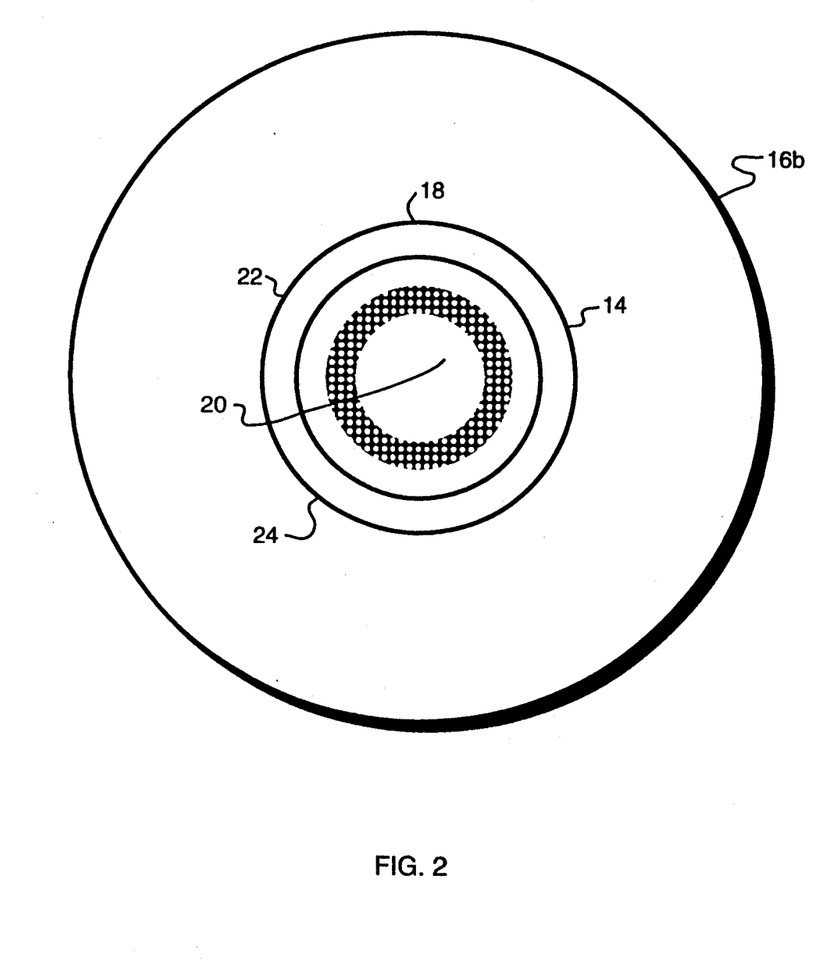
FIG. 2 is a section of the device shown in FIG. 1, taken along the line 2—2.

FIG. 2 illustrates the operation of micronizer 10 in greater detail. As shown in the figure, a liquid 20 travelling through the bore of membrane 14 at high velocity generates turbulence, which prevents radial fouling of the pores of membrane 14, outside a thin laminar region of flow 22. Inward radial pressure (provided by gas pressure within housing 18, the venturi effect created by conduits 16a and 16b, or both) maintains the gas flow velocity through the pores and promotes the formation of microscopic bubbles 24 within the flowing liquid 20; as discussed more fully below, the size of the bubbles is determined largely by (a) the pore size, and (b) the liquid turbulence, which minimizes the extent of laminar liquid layer 22 (where bubbles are formed) at the interface of the bulk liquid and the membrane. The velocity of liquid 20 is sufficiently high relative to the rate of bubble formation that the bubbles are dispersed throughout the liquid, which prevents bubble coalescence and mixing.

The axial extent of membrane 14 is determined by process considerations. As noted previously, the pressure drop across the length of membrane 14 results in bubble expansion, with the most significant increases in diameter experienced by bubbles formed at the inlet end. Reducing the axial length of membrane 14 lessens this effect, but at the expense of a reduction in the overall number of available pores. The skilled practitioner in the art can straightforwardly balance these competing criteria. We have found, for example, that using a membrane of generally tubular dimension with a nominal surface porosity of 25-30%, a pore size of 0.2 micron, and a diameter of 0.5 inch, a length as small as 6 inches is sufficient to allow introduction of 0.2 to 2 cubic feet per minute of air (or other suitable gas) at standard conditions of temperature and pressure (scfm) into a liquid stream flowing at a rate of 75-80 gallons per minute (gpm).

The material of membrane 14 governs the level of radial gas pressure necessary to maintain proper gas flow at a given fluid velocity. A material having high affinity for (i.e., easily wetted by) liquid 20 will demand a relatively high offsetting gas pressure to counteract this tendency, while material with lower affinity will require less pressure. It must be emphasized, however, that if the material of membrane 14 is too repellent with respect to liquid 20, the gas in region 22 may effectively "wet" all of the pores, resulting in a unitary sleeve of air and no bubble formation. Our preferred material for use with liquids having high water contents is porous stainless steel. This material requires low external gas pressure to achieve radial flow, offers resilience and adaptability to varied conditions, and is readily available in flat, tubular and irregular shapes.

For example, we have successfully employed tubular materials furnished by Mott Metallurgical Corp. Porous sheet membranes, also sold by Mott Metallurgical, can be configured into parallel-plate arrangements which, as described below, likewise fulfill the criteria of the present invention. The Membralox Division of US Filter Corp. offers multichannel ceramic membranes with separate stainless-steel housings, which form the shell for gas introduction. Rhone-Poulenc offers ceramic and silicon-carbide membrane elements with plastic or stainless-steel housings, either as single tubes or bundles of tubes in a single shell. Pall Filter Corp. sells ceramic, silicon carbide, and porous metal sheet and tubular constructions similar to those of the other manufacturers. With attention to the operating parameters, any of these constructions will suffice to implement the present invention.

One limitation of commercially available multichannel constructions is the entrance and exit effects that generate substantial pressure drops; however, tapered inlet and exit configurations can be applied to such units to minimize such effects. A negative characteristic associated with untreated ceramic surfaces is the greater bulk of the supporting structure around the membrane, which requires higher gas pressures to maintain exclusion of water; on the other hand, ceramic surfaces possess the desirable characteristic of relatively easy wettability.

Overall bubble diameters in the present invention are determined by pore size, the thickness of laminar layer 22, the pressure drop down the length of the device, the velocity and surface tension of liquid 20, and the Reynolds Number of the liquid. Once again, those skilled in the art can readily adjust these parameters to achieve a desired mean bubble diameter.

Bubbles produced with the present invention have mean diameters less than one micron. In addition, their characteristics can be described in terms of stored potential energy or stored work per unit bubble area.

The potential energy of a bubble may be defined as:

$$\text{Potential energy} = \frac{SG \times V^2 \times LFR^2}{GR \times D_{pore}^2 \times (L \times R)^{\frac{1}{2}}} \times 10^{-17}$$

where SG is the specific gravity of the gas under standard conditions, V is the average bulk velocity of the liquid relative to the membrane, LFR is the bulk flow rate of the liquid prior to gasification, GR is the gas flow rate, $D_{pore}$ is the average pore diameter, L is the length of the porous membrane, and R is the surface roughness of the porous material.

The stored work per unit bubble area may be defined by a work/area factor:

Work/Area Factor =

$$\frac{ST \times V \times PSA^2}{GR \times D_{pore} \times (CS \times D_{pore} \times L \times R)^4} \times 10^{-10}$$

where ST is the surface tension of the liquid being gasified, PSA is the porous surface area of the membrane used and/or available to transfer gas, CS is the cross-section of fluid flow through the porous membrane.

The properties associated with the present invention are obtained with bubbles having stored potential energies of at least 10 lbm/ft$^2$-sec$^2$ (where lbm is pounds mass), or a work/area factor of at least 0.5 lbf/ft (where lbf is pounds force). Preferably, stored potential energy exceeds 100 lbm/ft$^2$-sec$^2$ and the work/area factor exceeds 3 lbf/ft. To remove dissolved materials such as sodium chloride, stored potential energy typically exceeds 500 lbm/ft$^2$-sec$^2$ and the work/area factor exceeds 4 lbf/ft.

Figure 3:
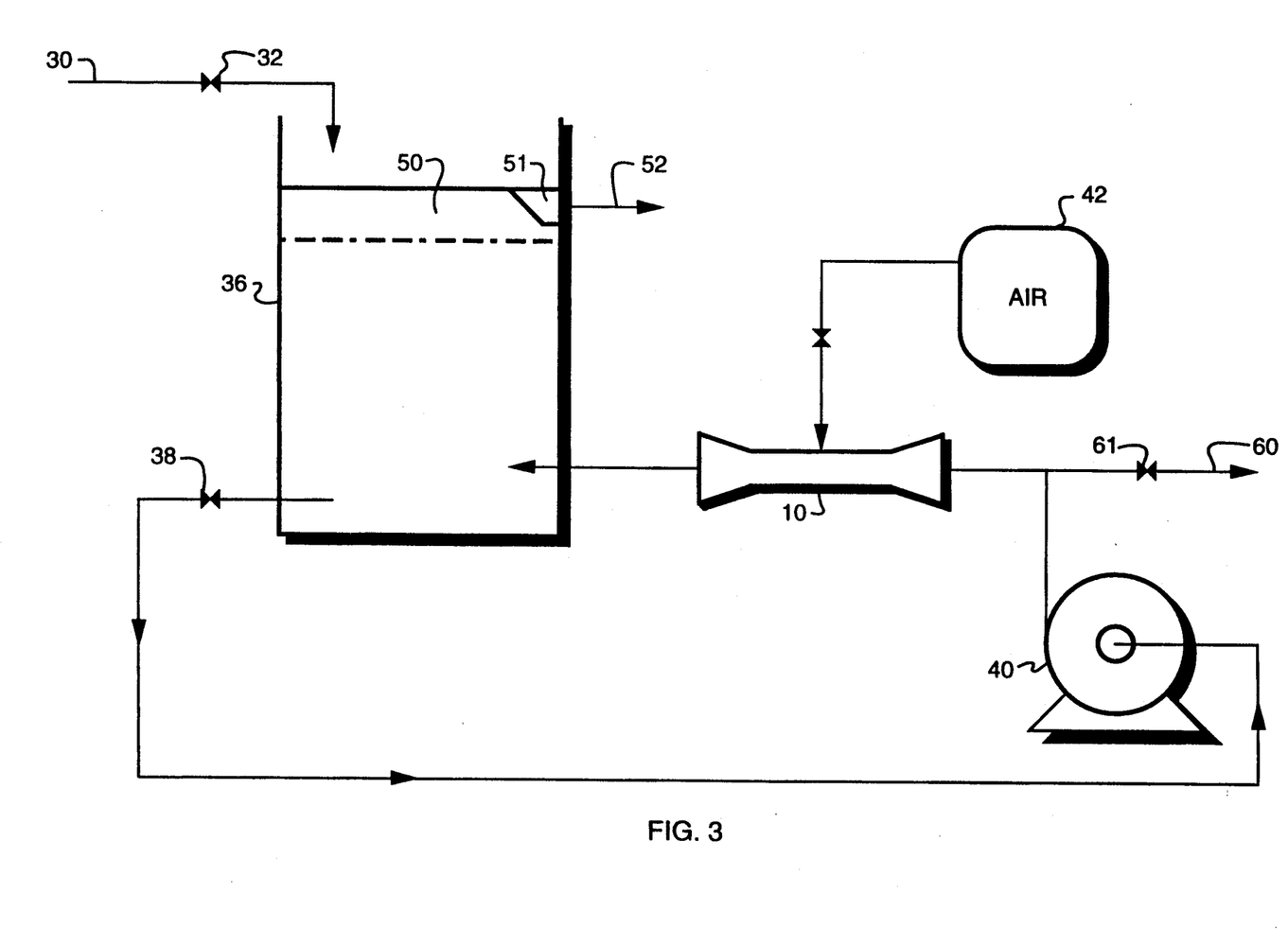
FIG. 3 is a flow diagram that schematically depicts implementation, in a wastewater-treatment context, of the micronizer illustrated in FIG. 1.

Refer now to FIG. 3, which illustrates application of the present invention in the context of wastewater purification. In the depicted embodiment, waste fluid is transported from a source 30 through a valve 32 and discharged into a bioreactor vessel 36. When sufficient fluid has accumulated therein, it is withdrawn through an outlet valve 38 by means of a motor-driven pump 40 and provided to the inlet of micronizer 10. A source of air 42 feeds micronizer 10 to form bubbles in the liquid passing therethrough. Upon exiting from micronizer 10, the aerated liquid is reintroduced into the bottom of vessel 36. Introduction of the aerated liquid, which contains submicron bubbles and transports them throughout the bottom region of vessel 36, results in accumulation at the surface of the liquid of a more highly concentrated, low-density layer of solids 50. This may skimmed off for disposal after a cycle of operation, at which point the underlying liquid has been substantially separated from its original solids content, or retained to enhance the efficiency of biological degradation processes. To facilitate removal by skimming, the illustrated vessel contains a removal weir or skimmer 52, which empties into a collection point 54. The system also includes an exit 60 for underflow of clarified liquid, which is controlled by a valve 61.

During operation, the system is maintained in a quiescent state to facilitate formation of solids layer 50. Preferred conditions, utilizing a vessel of 125,000-gallon capacity and an exposed surface area of 2,500 ft$^2$, include a recirculation rate of underflow no faster than once every 30 minutes with a velocity through the aeration tube of at least 30 ft/sec, and preferably greater than 60 ft/sec. A micronizer having dimensions as set forth above may be used in this application.

Figure 4:
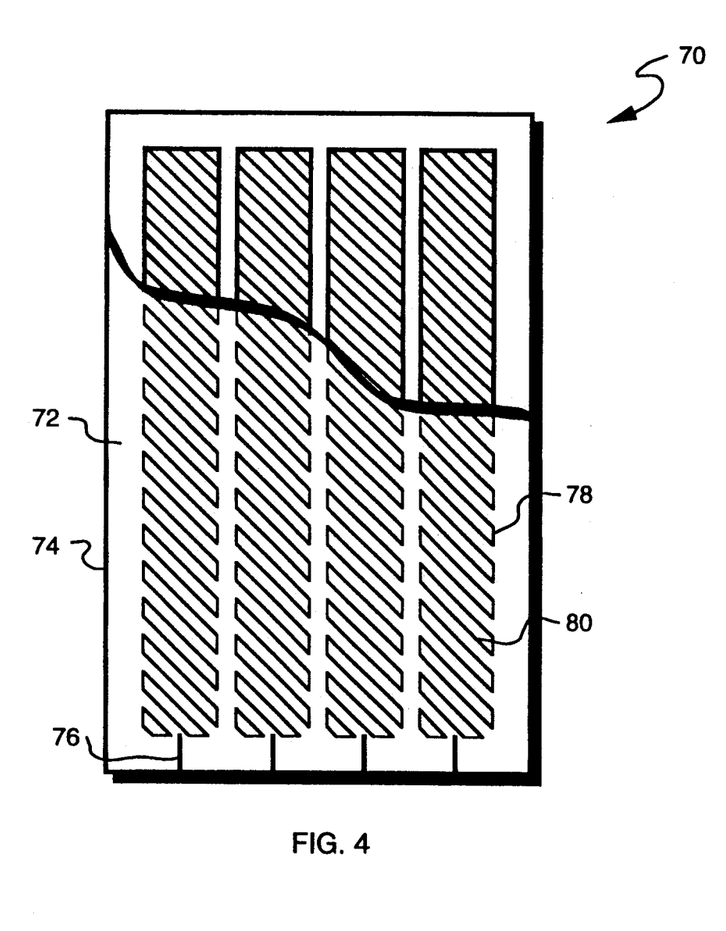
FIG. 4 is a partial cutaway end view of a second embodiment that employs rectangular liquid conduits.

It is not necessary, in the practice of this invention, to utilize porous membranes configured as tubes. Refer to FIG. 4, which illustrates a second embodiment of the invention 70 in which liquid passes through a series of rectangular channels or conduits. In this embodiment, a hollow area 72 accepts gas from a source (not shown), and is formed by an outer shell 74. Anchored to the interior of shell 74 by a series of supports 76 (along with additional, unshown supports, as necessary) are a plurality of porous membranes 78. The membranes define channels 80, through which liquid passes. Gas within hollow 72 penetrates membranes 78 to form submicron bubbles within liquid passing through channels 80 so long as the conditions and pore dimensions hereinbefore described are maintained. This design offers multichannel operation with a large throughput rate. Depending on efficiency and capacity considerations, not all of the surfaces of channels 80 need be microporous membranes; for example, such membranes may constitute the walls of channels 80 but not the ceilings or floors, which can be the same material as outer shell 74.

Figure 5:
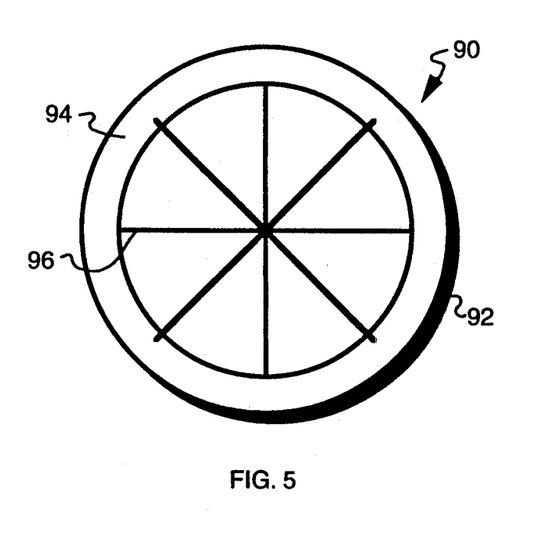
FIG. 5 is a plan view of a third embodiment of the invention that utilizes a rotating toroidal membrane.
Figure 6:
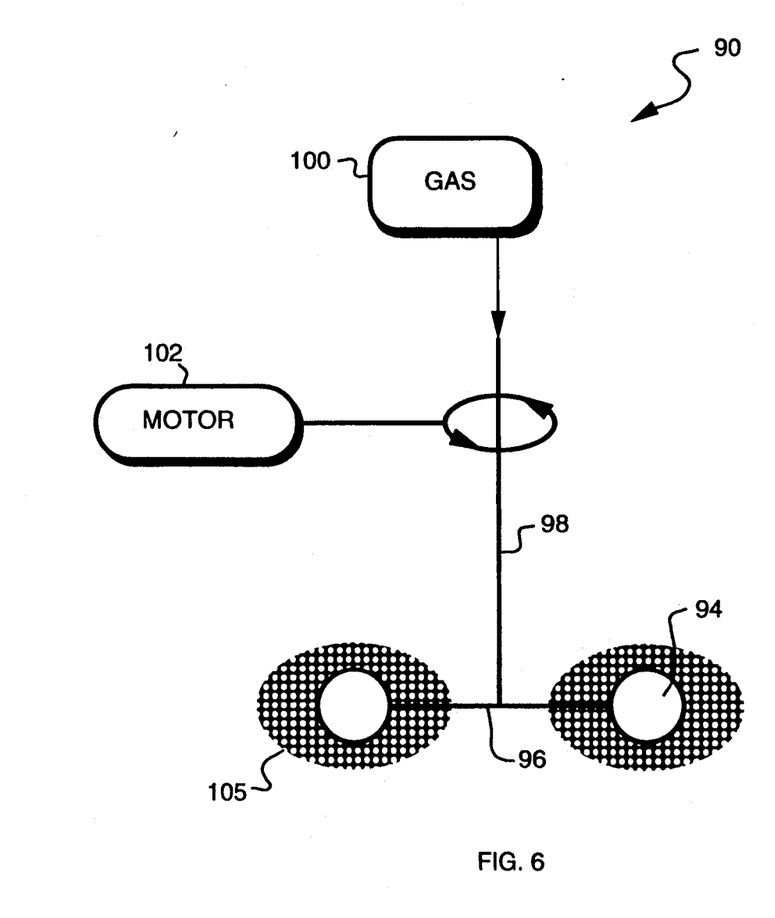
FIG. 6 is a sectional elevation of the device shown in FIG. 5.

FIGS. 5-8 illustrate an entirely different approach to practice of the present invention, in which the bulk liquid remains still and relative flow is caused by motion of the membrane. Refer to FIG. 5, which illustrates an embodiment 90 wherein the membrane takes the form of a rotating torus. With reference to FIG. 5, a toroidal membrane 92, with pore dimensions as described above, defines a hollow 94 that receives gas through a series of radial conduits 96. Conduits 96 also serve to support and rotate membrane 92. The operation of this embodiment is illustrated in FIG. 6. A central conduit 98 receives gas from a gas supply 100, and conveys the gas to radial conduits 96 (by means of a manifold or other suitable arrangement). A motor 102 causes rotation of conduit 98, either by direct engagement or otherwise. The spinning membrane 92, whose hollow 94 contains the gas, creates bubbles 105 in a zone surrounding the membrane. Once again, the bubbles will be of submicron dimension so long as proper relative flow velocity (i.e., the speed of motor 102) and membrane pore sizes are maintained.

Figure 7:
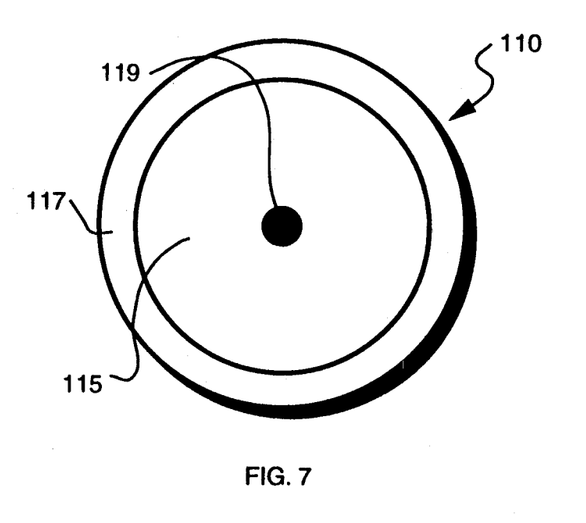
FIG. 7 is a plan view of a fourth embodiment in which the membrane comprises the annular extremity of a hollow disk.
Figure 8:
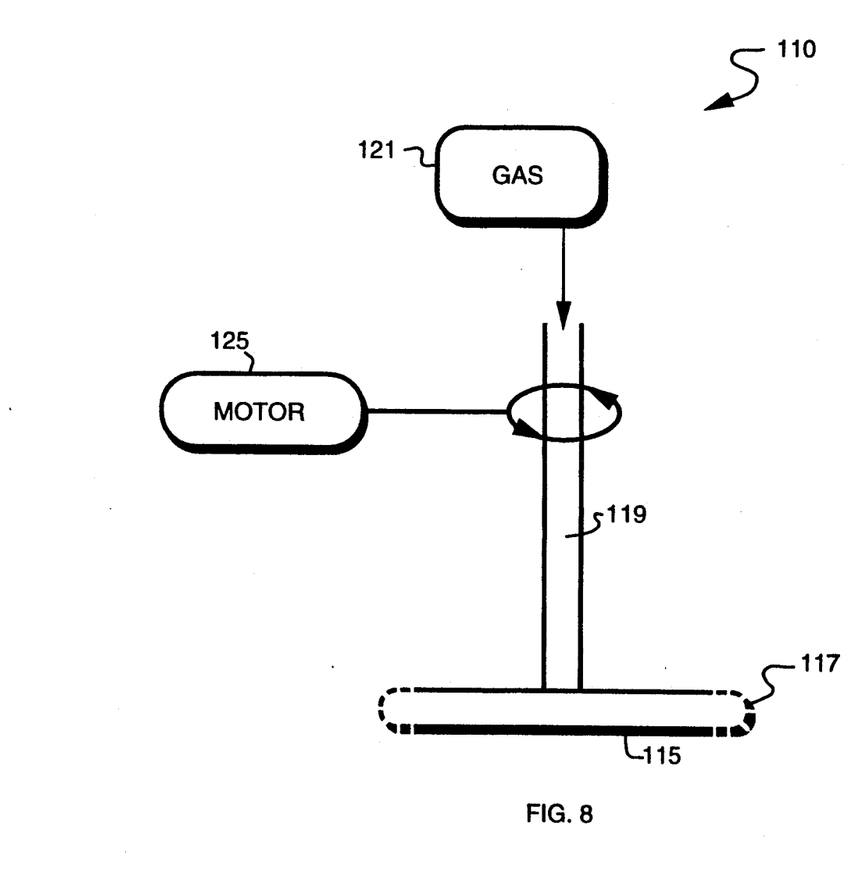
FIG. 8 is a sectional elevation of the device shown in FIG. 7.

An alternative to the foregoing embodiment is illustrated in FIGS. 7 and 8. Refer first to FIG. 7, which is a plan view of the alternative device 110. This device includes a hollow disk body 115 whose annular extremity is a porous membrane 117 having the characteristics described herein. Refer now to FIG. 7, which illustrates operation of the device. A central conduit 119 in open communication with body 115 receives gas from a source 121. A motor 125 causes rotation of conduit 119, either by direct engagement or otherwise. A zone of bubbles forms around membrane 117 as it spins.

It should be noted that membrane 117 occupies only a fraction of the radial extent of body 115 because the linear velocity of a rotating disk increases with radial distance from the center. Since relative flow velocity determines bubble size, too broad an annular area results in an unacceptably wide range of bubble sizes during operation. Moreover, an insufficiently large inner radial dimension of annular membrane 117 requires excessive motor power to maintain the spin rate necessary to generate minimum acceptable linear velocity. Similar considerations limit the usefulness of excessively wide toroidal hollows or an insufficiently large radius in connection with the embodiment illustrated in FIGS. 5 and 6.

The characteristics of bubbles generated by the present invention and their differences from those associated with the prior art are illustrated numerically in the following Table 1. The first three columns contain experimental data from the single-conduit design shown in FIG. 1 under different conditions; data from the fourth column arise from operation of the device described in the '187 patent; and the fifth and sixth columns derive from operation of multichannel devices of the present invention. The data demonstrate the considerable differences in potential energy and work/area of bubbles generated by the present invention as compared with those of the prior art.

grease, and were not considered usable for this primary treatment.

A micronizer apparatus in accordance with the present invention was installed in a recycling loop driven by a 1.5-hp centrifugal pump, which removed a portion of

TABLE 1

|  | 1 | 2 | 3 | 4 | 5 | 6 |
| --- | --- | --- | --- | --- | --- | --- |
| Flow Rate (gpm) | 60 | 120 | 35 | 12 | 20 | 60 |
| Diameter (inches) | 0.50 | 0.50 | 0.50 | 2.00 | 0.16 | 0.24 |
| Cross Section (sq. in.) | 0.196 | 0.196 | 0.196 | 3.142 | 0.370 | 0.833 |
| Length (ft) | 1.0 | 1.0 | 1.0 | 0.5 | 3.0 | 3.0 |
| Pore Size (microns) | 0.50 | 0.50 | 0.50 | 2.00 | 0.80 | 0.20 |
| Porous Area (sq. ft.) | 0.131 | 0.131 | 0.131 | 0.262 | 2.350 | 3.525 |
| Surface Tension (dynes/cm) | 50 | 50 | 50 | 50 | 50 | 50 |
| Absolute Roughness (ft) | 0.00015 | 0.00015 | 0.00015 | 0.00015 | 0.00300 | 0.00300 |
| s.g air (lbs/cu. ft) | 0.08074 | 0.08074 | 0.08074 | 0.08074 | 0.08074 | 0.08074 |
| air rate (scfm) | 0.20 | 0.20 | 0.02 | 6.71 | 1.00 | 1.00 |
| Reynolds Number | 335,940 | 671,880 | 195,965 | 17,233 | 18,712 | 37,425 |
| WORK/AREA FT LBF/FT$^2$ | 10.3 | 20.6 | 72.0 | 0.001 | 9.2 | 138.3 |
| PE LBM/FT$^2$/SEC$^2$ | 1448.6 | 11588.9 | 3450.5 | 0.000 | 0.2 | 13.0 |
| 1/s.g. air | 12.3854 | 12.3854 | 12.3854 | 12.3854 | 12.3854 | 12.3854 |
| surface tension | 0.0034 | 0.0034 | 0.0034 | 0.0034 | 0.0034 | 0.0034 |
| Velocity | 98 | 196 | 57 | 1 | 17 | 23 |
| Porous Area | 0.1309 | 0.1309 | 0.1309 | 0.2618 | 2.3500 | 3.5250 |
| Cross Section | 0.0014 | 0.0014 | 0.0014 | 0.0218 | 0.0026 | 0.0058 |
| Absolute Roughness | 0.0002 | 0.0002 | 0.0002 | 0.0002 | 0.0030 | 0.0030 |
| Length | 1.00 | 1.00 | 1.00 | 0.50 | 3.00 | 3.00 |
| Pore Diameter | 0.000002 | 0.000002 | 0.000002 | 0.000007 | 0.000003 | 0.000001 |
| Air Rate | 0.0033 | 0.0033 | 0.0003 | 0.1118 | 0.0167 | 0.0167 |
| water rate | 0.1337 | 0.2674 | 0.0780 | 0.0274 | 0.0446 | 0.1337 |

EXAMPLES

Example 1

Influent from a meat-processing plant was elevated from an open pit into an overflow weir that emptied into a tank 40 feet long, 8 feet wide and 6 feet deep. A submerged chain-and-flight skimmer moved settled solids from the bottom up a 45° inclined exit into a screw-conveyor exit; an elevated chain-and-flight skimmer moved foam onto a 4-foot beach placed 2 inches above the surface and into a separate screw conveyor for floating material. The flights moved at approximately 3 ft/min. Influent to the separator was at 0 gpm, 400 gpm, or 800 gpm, depending on whether one or two pumps were activated by level-control switches in the open-pit reservoir. The flow averaged 250 gpm from 5 AM to 10 PM, and ranged from 400–650 gmp from 10 PM to 5 AM. Its temperature was generally 90°–100° F. during low flows, and ranged from 130°–160° F. during high flows with considerable variation; the pH ranged from 4–14 but was generally observed within the range 9.5–12.

Without any added air, recovery of oil and grease ranged from 3–6% of influent values with no detectable diminution of suspended solids, soluble biological oxygen demand (BOD), or chlorides. With 1–5 cubic feet per minute (cfm) of mechanically induced air introduced by means of a recirculated effluent stream of 50–100 gpm, oil and grease recovery improved to 8–20% with a 5–10% reduction of suspended solids and no impact on soluble BOD or chloride content. Dissolved air flotation of the influent in an alternative unit provided recovery of oil and grease up to 50%, reduction of suspended solids of up to 60% during low throughput, and less than 10% recovery during periods of high flow. Neither soluble BOD nor chloride levels were affected. Addition of flocculants and/or coalescing aids such as ferric sulfate, alum, and/or polymeric materials eliminated the sales value of collected oil and the tank contents through a multichannel alpha-alumina membrane element having a total cross-sectional area of 0.83 in$^2$, a length of 33.5 inches, and a surface area of 3.3 ft$^2$. The bulk support had a bubble-point pore size of 12 microns; the inner surface had a membrane lining of the specified pore size and a nominal porosity of 30%. Variation of the fluid velocity as shown in Table 2 was accomplished by reduced suction supply to the pump and/or by diversion of part of the pump output around the micronizer to maintain a relatively constant flow through the device. The small entrance orifices (0.23-inch diameter) of the multichannel element were occasionally obstructed by solids, which were removed by temporarily reversing the flow through the membrane element. Air was supplied to the micronizer housing through a rotameter at 0.50–1 cfm, such that the air flow did not exceed 30% by volume of the liquid flow. Each entry of Table 2 represents a 24-hour time-weighted composite sample; influent and effluent samples were staggered by 30 minutes, representative of the average hydraulic residence time. Liquid velocities were estimated from known pressure-drop curves for the membrane element; exit pressure remained relatively constant at 3 psi, while inlet pressure varied in proportion to flow over the range 5–50 psi.

The following Table 2 summarizes the results of the foregoing runs, where the row labeled IN reflects values of the columnar variables prior to treatment, and the row labeled OUT contains post-treatment values. The row labeled % sets forth the percentage removal of each columnar variable as a result of treatment. The results demonstrate the significant, unexpected advantages obtainable with small-pore membranes at high flow velocities, and also indicate a somewhat reciprocal relationship between flow rate and pore size to achieve a given level of purification.

TABLE 2

Non-Biological Waste Water Treatment

| | BOD | O&G | TSS | CHLORIDE |
|---|---|---|---|---|
| 0.2 MICRON MEMBRANE | | | | |
| *nominal velocity 30 ft/sec* | | | | |
| IN | 1990 | 1280 | 2070 | 2010 |
| OUT | 473 | 140 | 314 | 441 |
| % | 76% | 89% | 85% | 78% |
| 0.8 MICRON MEMBRANE | | | | |
| *nominal velocity 40 ft/sec* | | | | |
| IN | 2370 | 1650 | 5580 | 2150 |
| OUT | 460 | 223 | 395 | 645 |
| % | 81% | 86% | 93% | 70% |
| *nominal velocity 35 ft/sec* | | | | |
| IN | 2280 | 1810 | 2830 | 1920 |
| OUT | 814 | 666 | 1000 | 797 |
| % | 64% | 63% | 65% | 58% |
| *nominal velocity 30 ft/sec* | | | | |
| IN | 1430 | 2100 | 3870 | 2090 |
| OUT | 1230 | 433 | 780 | 1320 |
| % | 14% | 79% | 80% | 37% |
| *nominal velocity 15 ft/sec* | | | | |
| IN | 2100 | 3950 | 11700 | 2790 |
| OUT | 1900 | 485 | 3870 | 2500 |
| % | 10% | 88% | 67% | 10% |
| *nominal velocity 5–10 ft/sec* | | | | |
| IN | 1660 | 654 | 2070 | 2050 |
| OUT | 1310 | 234 | 1590 | 1940 |
| % | 21% | 64% | 23% | 5% |

EXAMPLE 2

A sloped-sided basin of cross-section 80×108 feet at the top and descending 9.5 feet to a bottom cross-section of 60×23 feet contained 310,000 gallons of 15,000 mg/l biological-treatment sludge solids at pH 6.7–6.8. Dissolved oxygen content varied with depth and sample position from 0 to 4 parts per million (ppm). Only the bottom 6–12 inches exhibited any appreciable variation in concentration, that region containing more silt and sand than biomass and an overall solids level of about 20,000 mg/l. Attempts to aerate, clarify, and concentrate the basin with one or two 50-hp aerators followed by gravity settling showed no appreciable differences with depth, even following extended settling periods in excess of 7 days. Considerable odorous emissions of hydrogen sulfide, low-molecular-weight mercaptans, ammonia and hydrocarbons were detectable in the vicinity of the basin.

A nominal recirculation flow of 100–120 gpm was established via a 6-inch effluent pipe at 9-foot depth through a centrifugal pump to two micronizer apparatus in accordance with the present invention. One micronizer was constructed around a 0.5-inch (interior diameter), 9-inch-long porous, stainless-steel tube having 0.3-micron pores, and the other micronizer around a 0.5-inch (interior diameter), 12-inch-long porous, stainless-steel tube having 0.5-micron pores. The tubes were each welded into an individual 0.75-inch stainless-steel tube shell. One-inch interior-diameter PVC pipe delivered the recirculating liquid to the element from a 2-inch header at the top rim of the basin. One-inch interior-diameter PVC pipe, 35 feet in length, delivered the aerated liquid to the bottom of the basin at the junction of the sides and bottom distal from the effluent pipe. The venturi effect created by the restrictive aerator throat caused 10 scfh of air to be drawn into the 9 inch element and 4 scfh of air into the 12-inch element. Additional air was supplied to the elements by a compressor such that a constant flow of 10 scfh was supplied to each element. After 24 hours the recirculating liquid contained less than 1000 mg/l total suspended solids; after 48 hours less than 400 mg/l; after 7 days less than 300 mg/l; and after 14 days less than 200 mg/l. The relatively clear subnatant liquid was withdrawn from the recirculating effluent at 10–15 gpm. Within the increasing subnatant layer, dissolved oxygen content was maintained at 4–7 ppm for 10 days until the biological activity required an increase in the air supply to 20 scfh to each micronizer to support this level.

The supernatant solids layer contained 5.8–8.0% oven-dried solids (58,000–80,000 mg/l) by volume, equivalent to 6.5–12% by weight. The layer varied in thickness from 1–2 inches directly above the aerator return to as much as 2 feet in the remote corners of the basin. Samples of the solid top layer at various times and locations showed no tendency to disperse and remix with the subnatant layer. Thicker samples had aerobic top and bottom surfaces and a middle portion, which was anoxic and/or anaerobic. No odorous emissions were detectable once a cover of solids had been established (12 hours). Rainfall (in excess of 1 inch) caused a temporary decrease in the solids content of the surface solids layer, but the higher solids content was re-established within hours after rainfall stopped; water drained effectively through crevices and cracks in the solid covering layer.

EXAMPLE 3

In this example, the utility of the present invention in desalination pretreatment is demonstrated.

Incoming seawater to be used as a source for the generation of reverse-osmosis water is passed through a reservoir or tank capable of maintaining a hydraulic residence time of 12–24 hours. Fed from a bottom drain, raw water is passed through an aeration micronizer at velocities in excess of 45 ft/sec, and preferably in excess of 90 ft/sec. Air is introduced through the membrane having 0.2-micron or smaller pores at a volumetric rate equal to about 5% of the liquid flow rate. A skimming device continuously removes the finely divided foam, which consists of inorganic and biological solids as well as an increased concentration of dissolved inorganic and organic solids. Removals in excess of 80–85% of the initial total impurities are anticipated.

Use of this process in conjunction with reverse osmosis provides a number of considerable benefits. First, it reduces down time due to biological and inorganic fouling in direct proportion to the total amount of solids removed; in conventional applications, 10–15% down time is not uncommon. Second, and also in direct proportion to the amount of solids removed, the recovered yield of pure water as a function of energy input is increased. And third, once again in direct proportion to the amount of solids removed, membrane life is extended and the chemical costs for cleaning and water pretreatment are reduced.

The addition of polycationic floculants such as high-molecular-weight polyacrylates and polyacrylamides would be expected to improve the results even further.

EXAMPLE 4

It is well known that anaerobic digestion of materials is best carried out in liquids having the highest possible concentrations of solids. Deviation from this condition results in severe inefficiencies in both absolute biological rate and spatial efficiency. Use of the present invention facilitates use of oxygen-depleted or oxygen-free gas injection to separate the flow to be treated by anaerobic digestion into a high-solids phase, which may be efficiently converted, and a clarified effluent essentially free of biomass and suspended solids.

In a simple implementation, a closed-tank anaerobic digester is supplied with a micronized dispersion of recirculated off-gas (e.g., methane, carbon dioxide and-/or nitrogen) into raw feed containing suspended and dissolved solids to be digested. The dispersion segregates in the quiescent digester to consolidate solids in an upper layer, and provides a clear underflow effluent, essentially free of solids, for further disposition. In addition to supporting and separating the fresh incoming solids, the bulk lifting effect of the incoming dispersed solids attached to gas bubbles concentrates partially digested solids, releasing additional treated underflow and increasing the residual solids in the upper layer to maintain preferred conditions for further digestion. Depending upon the particular species and digester depths used, introduction of dispersed off-gas via partially recirculating underflow can provide additional consolidation of the solids for further treatment. The recirculation of the carbon dioxide contained in the off-gas will be beneficial to the yield of methane in certain instances, since its carbon content would normally be lost for further production of methane. The maintenance of the high-solids anaerobic digestion zone allows for continuous production without resorting to filtration or other separate unit operations to reconsolidate partially digested solids. The overall result is continuous clarification and anaerobic digestion using a single combination unit.

In a more complex application, a waste stream (or fermentation feedstock) is treated with a controlled dispersion of air to aerobically digest a fraction of the influent and consolidate the dissolved and dispersed solids into an upper high solids fraction and a lower, clarified underflow. The high-solids fraction is conveyed to a vertical, plug-flow reactor and dispensed onto the top of the earlier feed. The onset of anaerobic digestion, accelerated by the high solids content achieved under low-stress conditions, is expected to come about quickly. As the digestion progresses, the gas generated by digestion and the dispersed, oxygen-depleted gas from the original consolidation maintains the relatively high solids content preferred for anaerobic digestion, allowing removal of a solids-depleted underflow from the reactor for further treatment. Gasification of a recirculated underflow with oxygen-depleted gas enhances the quality of the underflow and helps to maintain high solids levels.

EXAMPLE 5

Use of air or an oxygen-enriched gas to segregate dissolved and dispersed solids from a depleted underflow increases the "space yield" of a traditional biological treatment or fermentation system without placing undue stress on the biological species used. In order to maintain the high and relatively constant dissolved oxygen levels required for beneficial conversion of raw materials by biological systems (enzymes, whole cells or cell fragments), traditional technology delivers oxygen in recirculating systems where high energy stress is imparted to the biomass as well as to the fluid media. This stress takes the form of continuous filtration of the biomass from the media, recirculation of the entire stream through an aspirator, or fixation of the biomass to a substrate where high media flow rates can be tolerated. Introduction of air or an oxygen-enriched stream in accordance with the present invention delivers high-surface-area bubbles to the consolidated solids in the upper layer of the reactor.

EXAMPLE 6

A large-surface-area aeration basin (219 feet in length, 108 feet wide and 8.5 feet deep) is currently used to aerobically treat 20,000 gallons per day of high-organic-content (5-20 ppm organics, soluble and dispersed) influent having a chemical oxygen demand (COD) value of 15,000-75,000 mg $O_2$ per liter, occasionally containing dissolved nickel in 0.1 to 10 ppm concentrations. Aeration provided by five 50-hp floating aerators maintains a dissolved oxygen content from 0.2 to 4 mg/l; suspended solids are maintained at 4,000-6,000 ppm; and an effluent quality ranging from 2,000 COD, 200 ppm suspended solids to 5,000 COD to 1,000 ppm suspended solids is obtained after passage through a standard overflow, underflow, overflow decanter of 10,000-gallon capacity, configured to return excess solids (waste sludge) to a separate basin or to the extended aeration basin. Nickel content of the effluent varies from undetectable levels to 2 ppm. General malodorous emissions and a distinctive organic odor vary in intensity but are consistently detectable in the vicinity of the treatment system.

Conversion to a high-efficiency biological treatment system without malodorous emissions is accomplished as follows. First, an underflow baffle is installed across the end of the present aeration basin to establish a clarifier section with capacity of 60,000-80,000 gallons. Low-level residual oxygen requirements are provided by incoming underflow liquid. Second, an overflow baffle with three underflow portals is installed across the midpoint of the aeration basin to establish a primary anaerobic digester section and a secondary aerobic digester section. Third, a micronizer aeration circulation loop is installed in the secondary aerobic section to provide floating solids cover for both primary anaerobic and secondary aerobic sections.

The solids cover established by the submicron-sized injected air serves the multiple purposes of eliminating malodorous emissions and returning excess solids to the unagitated, non-aerated, anaerobic (anoxic) primary section. The primary anaerobic section serves as an energy-conserving biomass digester that generates trace levels of hydrogen sulfide (which are not emitted due to the aerobic, floating solids cover), which in turn causes any incoming nickel to be precipitated in the form of nickel sulfide. The solids floated by the performance of the micronized air are prevented from leaving the system by the underflow retaining baffle, which serves to "protect" an overflow outfall. Circulation of the aerobic section at a rate of 2-4 volumes per day with the introduction of 20% air by volume is sufficient to provide solids flotation and oxygenation for aerobic biological conversion. The underflow portals facilitate hydraulic balance from the primary anaerobic section and the aerobic secondary section.

EXAMPLE 7

Efficient treatment without expending pump energy can be obtained with the apparatus described above in connection with FIG. 4. A parallel-plate micronizer can be inserted into the restricted flow of an open culvert used to transport wastewater and/or stormwater runoff. Using the arrangement described above with a nominal pore size of 0.05 micron, the velocity requirements are reduced to those obtained by gravity flow while maintaining submicron bubble sizes. Skimming equipment to remove the floated solids, dispersed oil and grease, soluble organics, and partially soluble inorganic contaminants is mounted downstream of the aeration unit a minimum of 4–5 depth equivalents.

What is claimed is:

1. An apparatus for the introduction, into a liquid, of gas bubbles having submicron dimension, the apparatus comprising:
   a. microporous element having an average pore size;
   b. means for exposing a surface of the microporous element to gas at a predetermined pressure; and
   c. means for causing relative movement between a liquid and the microporous element with sufficient motive force to achieve a relative velocity therebetween in excess of 10 ft/sec,
   wherein the average pore size of the microporous element is less than 1 micron.

2. The apparatus of claim 1 wherein the gas-exposure means and the relative-movement means cooperate to generate bubbles having average diameters less than 1 micron within a laminar region of the fluid.

3. The apparatus of claim 1 wherein the relative-movement means produces a relative liquid velocity that exceeds 40 ft/sec.

4. The apparatus of claim 1 wherein the relative-movement means produces a relative liquid velocity that exceeds 60 f/sec.

5. The apparatus of claim 1 wherein the microporous element, the gas-exposure means and the relative-movement means cooperate to produce bubbles that possess stored potential energies of at least 10 $lbm/ft^2-sec^2$.

6. The apparatus of claim 1 wherein the microporous element, the gas-exposure means and the relative-movement means cooperate to produce bubbles that possess stored potential energies of at least 100 $lbm/ft^2-sec^2$.

7. The apparatus of claim 1 wherein the microporous element, the gas-exposure means and the relative-movement means cooperate to produce bubbles that possess stored potential energies of at least 500 $lbm/ft^2-sec^2$.

8. The apparatus of claim 1 wherein the microporous element, the gas-exposure means and the relative-movement means cooperate to produce bubbles that possess work/area factors of at least 0.5 lbf/ft.

9. The apparatus of claim 1 wherein the microporous element, the gas-exposure means and the relative-movement means cooperate to produce bubbles that possess work/area factors of at least 3 lbf/ft.

10. The apparatus of claim 1 wherein the the microporous element, the gas-exposure means and the relative-movement means cooperate to produce bubbles that possess work/area factors of at least 4 lbf/ft.

11. The apparatus of claim 1 further comprising a housing surrounding the microporous element and wherein both the microporous element and the housing are of substantially tubular shape and coaxial with one another.

12. The apparatus of claim 11 wherein the microporous element has inlet and outlet ends, and further comprising:
   a. an inwardly tapered approach conduit coupled to the inlet end of the microporous element;
   b. an outwardly tapered exit conduit coupled to the outlet end of the microporous element;
   c. means for pumping a fluid into the approach conduit at a flow rate of at least 10 ft/sec;
   d. a housing surrounding the microporous element to form a sealed channel therebetween; and
   e. means for introducing gas into the channel.

13. The apparatus of claim 12 wherein the relative-movement means produces a relative liquid velocity that exceeds 40 ft/sec.

14. The apparatus of claim 12 wherein the relative-movement means produces a relative liquid velocity that exceeds 60 ft/sec.

15. The apparatus of claim 12 wherein the average pore size is 0.2 micron.

16. The apparatus of claim 1 wherein the apparatus includes a plurality of microporous elements disposed in a series of conduits, each conduit:
   a. comprising a microporous element;
   b. having inlet and outlet ends; and
   c. being surrounded by a common housing in sealed relationship therewith,
   the apparatus further comprising:
   d. means for pumping a fluid into inlet ends of the microporous elements at a flow rate of at least 10 ft/sec; and
   e. means for introducing gas into the housing.

17. The apparatus of claim 16 wherein the relative-movement means produces a relative liquid velocity that exceeds 40 ft/sec.

18. The apparatus of claim 16 wherein the relative-movement means produces a relative liquid velocity that exceed 60 ft/sec.

19. The apparatus of claim 16 wherein the average pore size is 0.2 micron.

20. The apparatus of claim 1 wherein:
   a. the microporous element is of toroidal configuration and possesses a continuous interior region;
   b. the gas-exposing means is a series of radial conduits, each having one end in open communication with the interior of the microporous element and another end in communication with a gas supply; and
   c. the means for causing relative movement is a motor configured so as to cause rotation of the microporous element relative to a surrounding fluid.

21. The apparatus of claim 20 wherein the relative-movement means produces a relative liquid velocity that exceeds 40 ft/sec.

22. The apparatus of claim 20 wherein the relative-movement means produces a relative liquid velocity that exceeds 60 ft/sec.

23. The apparatus of claim 20 wherein the average pore size is 0.2 micron.

24. The apparatus of claim 1 wherein:
   a. the microporous element is an annular region of a disk-shaped body having a continuous interior region;
   b. the gas-exposing means is a conduit having one end in open communication with the interior of the body and another end in communication with a gas supply; and
   c. the means for causing relative movement is a motor configured so as to cause rotation of the microporous element relative to a surrounding fluid.

25. The apparatus of claim 24 wherein the relative-movement means produces a relative liquid velocity that exceeds 40 ft/sec.

26. The apparatus of claim 24 wherein the relative-movement means produces a relative liquid velocity that exceeds 60 ft/sec.

27. The apparatus of claim 24 wherein the average pore size is 0.2 micron.

28. A method of treating a liquid contained in a vessel, the method comprising the steps of:
 a. providing a porous membrane having a surface and an average pore size less than one micron;
 b. withdrawing liquid from the vessel;
 c. causing relative movement between the withdrawn liquid and the surface of the membrane to achieve a relatively velocity therebetween of at least 10 ft/sec;
 d. returning the liquid into the vessel, and
 e. maintaining quiescent conditions within the vessel.

29. The method of claim 28 wherein the porous membrane is of a configuration including:
 a. inlet and outlet ends;
 b. an inwardly tapered approach conduit coupled to the inlet end; and
 c. an outwardly tapered exit conduit coupled to the outlet end.

30. The method of claim 28 wherein introduction of the bubble-containing liquid into the vessel concentrates solids into a relatively distinct upper layer.

31. The method of claim 28 wherein the bubbles possess stored potential energies of at least 10 $lbm/ft^2$-$sec^2$.

32. The method of claim 28 wherein the bubbles possess work/area factors of at least 0.5 lbf/ft.

33. The method of claim 28 wherein the liquid is a brackish or saline fluid and the bubbles possess stored potential energies of at least 500 $lbm/ft^2$-$sec^2$.

34. The method of claim 28 wherein the liquid is a brackish or saline fluid and the bubbles possess work/area factors of at least 4 lbf/ft.

35. The method of claim 28 further comprising the step of exposing the liquid, through the porous membrane, to a gas comprising at least one member of the group consisting of air, oxygen, methane, carbon dioxide, and nitrogen.

* * * * *